UNITED STATES PATENT OFFICE.

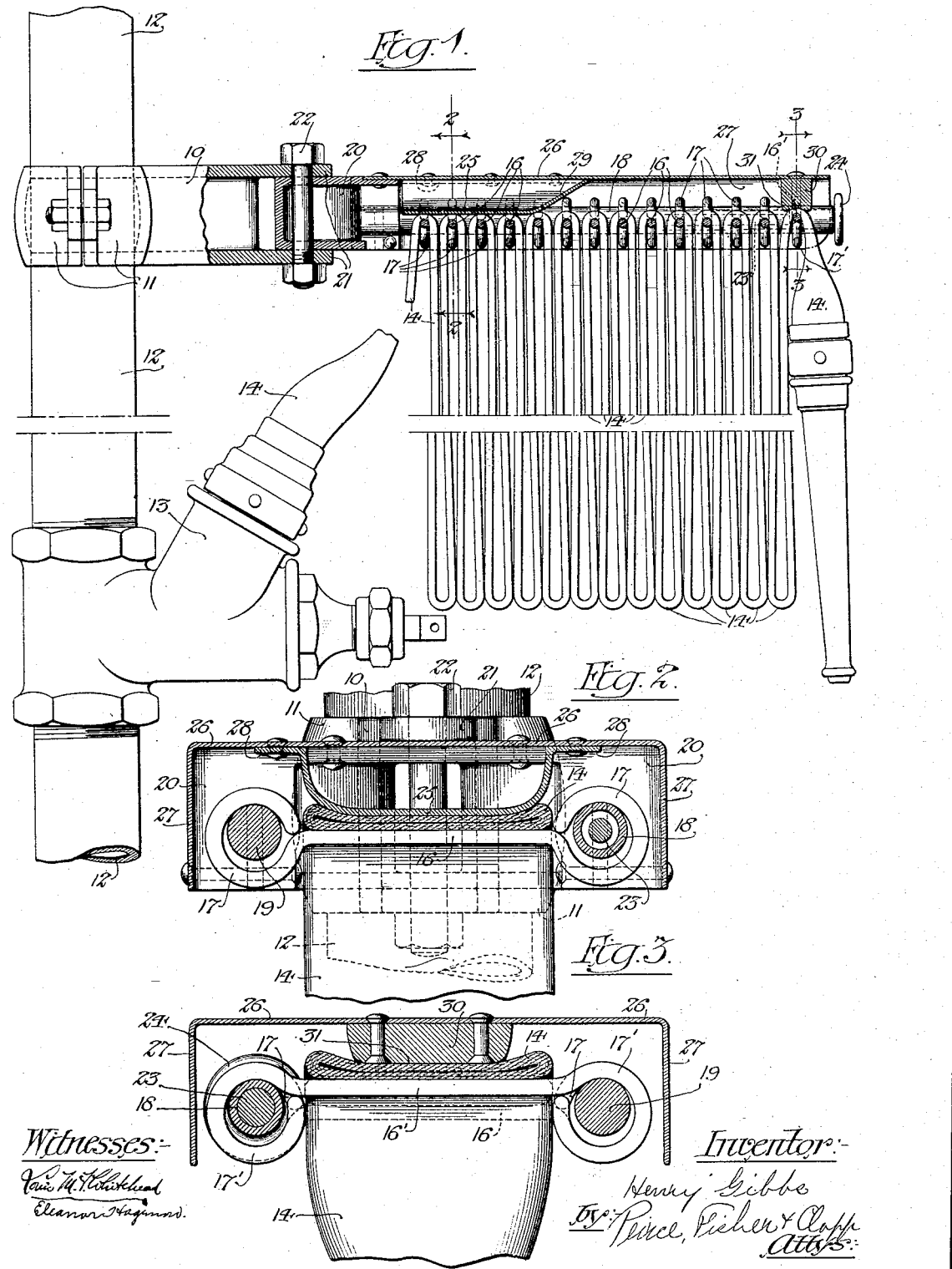

HENRY GIBBS, OF CHICAGO, ILLINOIS, ASSIGNOR TO W. D. ALLEN MANUFACTURING COMPANY, OF CHICAGO, ILLINOIS, A CORPORATION.

HOSE-RACK.

1,177,316.  Specification of Letters Patent.  Patented Mar. 28, 1916.

Application filed March 25, 1914. Serial No. 827,186.

*To all whom it may concern:*

Be it known that I, HENRY GIBBS, a citizen of the United States, and a resident of Chicago, county of Cook, and State of Illinois, have invented certain new and useful Improvements in Hose-Racks, of which the following is a full, clear, and exact description.

The invention relates to racks for supporting hose for fire protecting purposes. In such racks, the hose is generally carried in folds or loops so that it can be quickly withdrawn for use in case of fire. It sometimes happens that the valve to which the hose is connected is opened before the hose is removed from the rack and, in such cases, particularly if the water supply be under considerable pressure, the hose will be forced bodily from the rack and is apt to become entangled.

The object of the present improvement is to provide means in connection with the rack for clamping or gripping the hose at one or more points, preferably adjacent the valve, so that in case the valve is opened, the water cannot flow therethrough until the hose is entirely removed from the rack.

The invention also seeks to provide improved means for effectively gripping the hose to prevent the flow of water therethrough and which means is of simple construction, not liable to get out of order and which is so arranged that it will not interfere with the ready removal of the hose from the rack.

The invention further seeks to provide simple and effective means for engaging the hose near its free end to prevent the accidental displacement thereof from the rack.

The invention consists in the features of improvement hereinafter set forth, illustrated in the preferred form in the accompanying drawing and more particularly pointed out in the appended claims.

The invention is shown as applied to that type of rack in which the hose is carried in a series of pendent loops by suitable supports or cross-pins which are shiftable to release the successive loops as the hose is withdrawn from the rack. In the preferred embodiment set forth, the cross-pins are slidably mounted on a pair of side arms, so that they move longitudinally of the rack and are disconnected from the free end of at least one of said side arms to release the loops of hose.

In the drawings, Figure 1 is a vertical longitudinal section of the rack with the parts associated therewith shown in elevation. Figs. 2 and 3 are cross-sections on the lines 2—2 and 3—3, respectively, of Fig. 1.

As usual, the rack is mounted to swing in a horizontal plane on a suitable supporting bracket 10. As shown, this bracket is provided at its end with suitable clamp members 11 by which it is secured to the supply pipe 12, the latter having a valve 13 to which one end of the hose 14 is secured. It is, of course, understood that the bracket 10 may be otherwise supported in place adjacent the valve. The hose 14 is provided, as usual, at its free end with a suitable nozzle 15 and in the construction shown, it is carried in a series of pendent loops upon a number of supports or cross-pins 16 which are mounted on the rack, but which are arranged to release the successive loops of hose as the latter is withdrawn.

In the preferred construction shown, the hose carrying cross-pins 16 are provided with circular eyes 17 at their ends which encircle a pair of side arms 18 and 19. These arms are circular in section and are fixed at their inner ends to a cast metal yoke 20. The yoke 20 extends between upper and lower arms 21 on the supporting bracket 10 and is connected thereto by a vertical pivot bolt 22. Normally, the bights of the flattened hose extend over the cross-pins 16 and the hose depends therefrom by a series of adjacent loops. By grasping the nozzle 15, the hose may be readily withdrawn from the rack, since the pins are free to slide outwardly over the free ends of the side arms 18 and 19 to release the successive loops of hose. Preferably, the pins are disengaged from the free end of only one of the side arms. In the construction shown, the arm 18 is hollow and a rod 23 extends therein. The outer end of this rod is provided with an enlarged head 24 which is arranged to be engaged by the eyes or loops 17 of the cross-pins and is drawn outwardly when the hose is removed from the rack, so that the rod serves to catch and retain the pins as they are disengaged from the free ends of the arms 18 and 19 of the rack.

While the present invention is particularly applicable to the type of hose rack above described, it may be applied to other types and, as far as the broad aspects of the invention are concerned, the parts thus far set forth may be of any usual or suitable construction.

In accordance with the present invention, the clamp member is arranged to coöperate with one or more of the hose carrying supports 16 to grip the hose at one or more points. Preferably, the clamp member is arranged to coöperate with a number of the cross pins to grip the hose at a number of points at the inner end of the rack and adjacent the valve to which the hose is connected.

In the construction shown, the clamp 25 is fixed in position upon the rack and extends over a number of the hose carrying supports or pins 16 at the inner end thereof. This clamp is preferably formed of pressed sheet metal and is fixed to the under side of a guard or shield 26 that is also formed of pressed sheet metal. This guard or shield is provided with depending side flanges 27 and the inner ends of the main body of the shield and of its flanges are securely riveted or otherwise suitably connected to the yoke 20 of the rack. The shield 26 extends outwardly above the side arms 18 and 19 and the hose carrying pins, and its flanges 27 depend outside of the eyes or loops 17, so that nothing can interfere with the ready removal of the hose in case of emergency.

The clamp 25 is U-shaped in section and is provided with edge flanges 28 by which it is riveted or otherwise suitably secured on the under side of the shield 26, and the clamp is so disposed relatively to the cross-pins that a number of bights of the hose are gripped between the pins at the inner end of the rack and the under face of the clamp. Preferably, as most clearly shown in Fig. 2, the corners of the clamp are rounded, so that undue pressure is not exerted upon the folded edges of the flattened hose. The clamp is also provided with an upwardly inclined or beveled outer end 29 so that the bights of hose may be readily forced into engagement therewith by looping the hose over the pins and then forcing the latter inwardly beneath the clamp.

With the improved construction, the hose is gripped at one or more points adjacent the valve, so that in case the latter is opened before the hose is withdrawn from the rack, water cannot flow through the hose and cannot force it bodily from the rack. Nevertheless, by grasping the free end of the hose it can be readily withdrawn from the rack and as it is withdrawn, the hose carrying cross-supports or pins move outwardly and release the successive loops of hose. The pull upon the hose will, of course, withdraw the pins at the inner ends of the rack from beneath the clamp, so that, as soon as the hose is entirely withdrawn, the grip of the clamp thereon is released and water will flow therethrough. Ordinarily, it is necessary to first withdraw a hose from the rack and then return to the valve and open it. In the present construction, the valve may be opened before the hose is withdrawn without danger of entangling the hose, and as soon as the hose is removed from position on the rack, the water will flow therethrough. In this way, considerable time is saved in cases of emergency.

To prevent the accidental disengagement of the loops of hose at the outer end of the rack, the shield is provided at its outer end with a cast metal abutment 30 which is riveted to the under side thereof. This abutment is provided on its under side with a groove 31 which is arranged to coöperate with the outer end pin 16 to clamp the bight or fold of the hose adjacent the nozzle. Preferably, all of the pins, except the end pin 16', are arranged in horizontal alinement, but the eyes 17' of the end pin are so arranged that the latter is held above the other pins and in proper position to coöperate with the abutment 30. The shield 26, which is fixed at its inner end, is somewhat resilient, so that the grip of the abutment or clamp 30 at its outer end and of the pin 16' upon the hose is yielding and, while it properly supports the weight of the nozzle 15, the hose is readily disengaged by the first pull upon the nozzle 15. Inasmuch as the abutment 30 is arranged well above the path of movement of the other pins and of the folds or bights of hose thereon, it will not interfere with the ready disengagement of the other folds of hose from the rack.

It is obvious that numerous changes may be made in the details set forth without departure from the essentials of the invention as defined in the claims.

I claim as my invention:—

1. A hose rack having a series of sliding supports for carrying a hose in loops, and a clamp arranged above and in proximity to a plurality of said supports, said clamp having a long, flat bearing surface on its under side to grip several of the loops of hose.

2. A hose rack having side arms, bodily movable cross supports slidably mounted upon said arms, and a clamp located between said side arms, said clamp having the part that engages the hose unyieldingly mounted above a plurality of said supports to grip the hose at different points.

3. A hose rack having a series of slidably mounted cross supports for carrying the hose in loops, and a clamp arranged above said supports, said clamp having an upwardly inclined outer end.

4. A hose rack having a series of cross supports for carrying the hose in loops, and a clamp arranged above said cross supports, said clamp having a long bearing face on its under side extending horizontally across a plurality of said supports and having its front end upwardly and forwardly inclined to permit the hose supports with the hose thereon to be slipped beneath the clamp.

HENRY GIBBS.

Witnesses:
ELEANOR HOGENOW,
J. G. ANDERSON.

Copies of this patent may be obtained for five cents each, by addressing the "Commissioner of Patents, Washington, D. C."